(12) United States Patent
Sinnema et al.

(10) Patent No.: US 9,750,271 B2
(45) Date of Patent: Sep. 5, 2017

(54) APPARATUS FOR PRODUCING A DRINK, AND THE USE OF THE APPARATUS

(71) Applicant: KONINKLIJKE PHILIPS N.V., Eindhoven (NL)

(72) Inventors: Anke Sinnema, Eindhoven (NL); Simon M. Oversteegen, Eindhoven (NL); Peter S. Viet, Eindhoven (NL); Bernardus L. Kuiper, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 178 days.

(21) Appl. No.: 14/612,709

(22) Filed: Feb. 3, 2015

(65) Prior Publication Data

US 2015/0150294 A1    Jun. 4, 2015

Related U.S. Application Data

(62) Division of application No. 12/595,248, filed as application No. PCT/IB2008/051382 on Apr. 11, 2008, now Pat. No. 8,978,928.

(30) Foreign Application Priority Data

Apr. 16, 2007  (EP) .................................. 07106247
Mar. 14, 2008  (EP) .................................. 08152745

(51) Int. Cl.
*A23L 1/29*        (2006.01)
*A47J 31/40*       (2006.01)
(Continued)

(52) U.S. Cl.
CPC ............... *A23L 1/296* (2013.01); *A23L 33/40* (2016.08); *A47J 31/404* (2013.01); *A47J 31/56* (2013.01);
(Continued)

(58) Field of Classification Search
CPC ...... A47J 31/404; A47J 31/56; A47J 36/2433; A23L 1/296; A23L 33/40
(Continued)

(56) References Cited

U.S. PATENT DOCUMENTS 4,791,860 A   12/1988 Verheijen
4,901,886 A    2/1990 Kirschner
(Continued)

FOREIGN PATENT DOCUMENTS

DE   3511159 A1   10/1986
EP   0244010 A1   11/1987
(Continued)

OTHER PUBLICATIONS

Enterobacter Sakazakii and Salmonella in Powdered Infant Formula: Meeting Report. (Extract: Contents, pp. 42-42, pp. 6772) Published in 2006.
(Continued)

*Primary Examiner* — J. Casimer Jacyna

(57) ABSTRACT

A method for producing a drink, for example milk, from mixing a powder formula with a liquid, such as water, in an automated baby-milk machine. The method included preparing a drink concentrate by mixing the amount of formula necessary for the total amount of drink in a certain amount of hot liquid, and adding the right amount of liquid of a certain low temperature to the concentrate in order to reach the end volume of the drink at a safe drinking temperature.

18 Claims, 6 Drawing Sheets

Figure 1A:
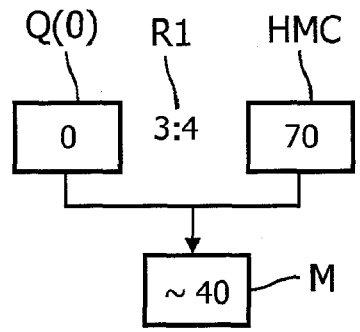

(51) Int. Cl.
*A47J 36/24* (2006.01)
*A47J 31/56* (2006.01)
*A23L 33/00* (2016.01)

(52) U.S. Cl.
CPC ....... *A47J 36/2433* (2013.01); *A23V 2002/00* (2013.01)

(58) Field of Classification Search
USPC .... 222/1, 54, 129.1, 129.3, 129.4, 132, 134, 222/135, 146.1, 146.2, 146.6, 189.06, 190
See application file for complete search history.

(56) References Cited

U.S. PATENT DOCUMENTS

| | | | |
|---|---|---|---|
| 5,032,265 | A | 7/1991 | Jha |
| 5,584,229 | A | 12/1996 | Anson |
| 5,975,365 | A * | 11/1999 | Hsieh .................. G07F 13/065 222/129.3 |
| 6,240,829 | B1 | 6/2001 | McGarrah |
| 6,411,777 | B2 | 6/2002 | Roberson |
| 6,648,174 | B2 | 11/2003 | Greene |
| 6,783,713 | B2 | 8/2004 | Tremblay |
| 7,104,184 | B2 | 9/2006 | Biderman |
| 2003/0019802 | A1 | 1/2003 | Roff |
| 2004/0149136 | A1 * | 8/2004 | Halle .................. A47J 31/404 99/275 |
| 2005/0150393 | A1 | 7/2005 | Biderman |
| 2005/0173015 | A1 | 8/2005 | Dhaliwal |
| 2007/0051901 | A1 | 3/2007 | Hopaluk |
| 2008/0041236 | A1 | 2/2008 | Raouf |
| 2008/0264353 | A1 * | 10/2008 | Eli .................. B67D 1/0014 122/13.01 |

FOREIGN PATENT DOCUMENTS

| | | |
|---|---|---|
| EP | 0212222 B1 | 3/2009 |
| EP | 2134222 B1 | 11/2011 |
| JP | 10005315 A | 1/1998 |
| JP | 2004283243 A | 10/2004 |
| JP | 3118417 U | 1/2006 |
| WO | 9915056 A2 | 4/1999 |
| WO | 9932409 A1 | 7/1999 |
| WO | 9958453 A1 | 11/1999 |
| WO | 0219875 A1 | 3/2002 |
| WO | 2005067385 A2 | 7/2005 |
| WO | 2005120313 A1 | 12/2005 |
| WO | 2006077259 A1 | 7/2006 |
| WO | 2007014654 A1 | 2/2007 |
| WO | 2007021110 A1 | 2/2007 |
| WO | 2007135611 A2 | 11/2007 |
| WO | 200801234 A1 | 1/2008 |
| WO | 2008126037 A1 | 10/2008 |

OTHER PUBLICATIONS

Department of Health, Guidance for Health Professionals on Safe Preparation, Storage and Handling of Powdered Infant Formula:, Perparation Feeds in the Home (STEPS1-11), Food Standard Agency, Published on Nov. 22, 2005.
"Safe Preparation, Storage and Handling of Powdered Infant Formula", Guidelines, World Health Organization, Copyright 2007.
Extract of Wikipedia, the Free Encyclopedia,—"Pathogen". http://en.wikipedia.org/wiki/pathogen.

* cited by examiner

Add cold water to hot milk concentrate

APPARATUS FOR PRODUCING A DRINK, AND THE USE OF THE APPARATUS

This application is a divisional of prior U.S. patent application Ser. No. 12/595,248, filed Oct. 9, 2009, which is a national application of PCT Application No. PCT/IB2008/051382, filed Apr. 11, 2008 and claims the benefit of European Patent Application No. 07106247.5, filed Apr. 16, 2007, and European Patent Application No. 08152745.9, filed Mar. 14, 2008, the entire contents of each of which are incorporated herein by reference thereto.

The invention relates to an apparatus for producing a drink from mixing a powder formula with a liquid, preferably water. More in particular the invention relates to an automated baby-milk machine. With this appliance, a bottle of formula milk can be prepared at the touch of a button.

Recently a new directive according preparation of formula milk is valid for the UK and probably will spread wider.

Powdered Infant Formula can be contaminated with a bacteria *e. sakazakii*. This cannot fully be prevented and in specific cases can lead to severe illness or even death. The bacteria can be inactivated by preparing milk above 60° C. (i.e. above a temperature of 60° C.). It is almost instantly inactivated at 70° C. Therefore it is advised to prepare formula milk at 70° C. and subsequently cool it down under the tap (manual preparation), see the following known Guidance for Preparation Feeds in the Home (steps 1-11):

"Guidance for Preparing Feeds in the Home Preparing a feed using powdered infant formula Important Normally each bottle should be made up fresh for each feed. Storing made-up formula milk may increase the chance of a baby becoming ill arid should be avoided.
1. Clean the surface thoroughly on which to prepare the feed
2 Wash hands with soap and water and then dry.
3. Boil fresh tap water in a kettle. Alternatively bottled water that is suitable for infants can be used for making up feeds and should be boiled in the same way as tap water.
4. Important: Allow the boiled water to cool to no less than 70° C. This means in practice using water that has been left covered, for less than 30 minutes after boiling.
5 Pour the amount of boiled water required into the sterilised bottle.
6. Add the exact amount of formula as instructed on the label Adding more or less powder than instructed could make the baby ill.
7 Re-assemble the bottle following manufacturer's instructions.
8 Shake the bottle well to mix the contents.
9 Cool quickly to feeding temperature by holding under a running tap, or placing in a container of cold water.
10 Check the temperature by shaking a few drops onto the inside of your wrist—it should feel lukewarm, not hot.
11. Discard any feed that has not been used within two hours."

Prior art apparatus and methods lead to several problems or disadvantages, including: a mixing at a too low temperature (no inactivation), or a mixing at a too high temperature (decrease of nutritional value). Besides, prior art systems can lead to too slow cooling of the milk, i.e., the milk remains a long time at a too high temperature. Consequently, bacterial regrowth can occur, and nutritional value decreases. Another problem is a burning danger (milk was not cooled down sufficiently). Moreover, prior art systems can lead to no proper solution of the powder into the water, and therefore to no proper inactivation.

The present invention aims to solve or alleviate at least part of the above-mentioned problems. Particularly, the invention aims to provide an improved apparatus for producing a drink (i.e. beverage).

According to an embodiment, this is achieved by an apparatus for producing a drink, for example milk, from mixing a powder formula with a liquid, preferably water, the apparatus preferably being an automated baby-milk machine. Preferably, the apparatus is configured to prepare a drink concentrate by mixing the amount of formula necessary for the total amount of drink in a certain amount of hot liquid, and to add the right amount of liquid of a certain low temperature to the concentrate in order to reach the end volume of the drink at a safe drinking temperature.

In this way, a drink of a desired safe drinking temperature can be generated, particularly in an efficient and relatively swift manner.

For example, the mentioned certain amount of hot liquid can be a small amount of hot liquid, for example an amount that is smaller than the amount of liquid of a certain low temperature that is used. Besides, in certain embodiments, the certain amount of hot liquid can be the same amount as the amount of liquid of a certain low temperature that is used, or it can be higher than the low temperature liquid amount. This depends for example on the desired safe drinking temperature, the temperature of the hot liquid and the temperature of the low temperature liquid.

An embodiment can include a fast cool down of the drink (for example milk) prepared at a high temperature.

A further embodiment can include: prepare a milk concentrate by mixing the amount of formula necessary for the total amount of milk in a certain amount of hot water (for example having a temperature between 30-80 degrees C., preferably 37-70 degrees C.). The further embodiment can also include: adding a right amount of water of a certain temperature (for example being lower than the temperature of the hot water) to the concentrate in order to reach the end volume of milk at a safe drinking temperature (the safe drinking temperature for example being in the range of 20-45 degrees C., preferably 37 degrees C.). Basic calculation for reaching an end temperature T-final by mixing 2 volumes with a certain temperature of the same liquid can include the equation (see also FIG. 1):

$$(T\text{ final} \times V\text{ final}) = (T\text{ high} \times V\text{ high}) + (T\text{ low} \times V\text{ low}) \qquad (1)$$

wherein:
V low=volume of liquid with a low temperature;
V high=volume of liquid with a higher temperature (i.e. higher than the low temperature);
V final=V low+V high;
T final=temperature of a final mix of V low and V high;
Tlow=temperature of the coldest fluid, i.e. the low temperature; and
T high=temperature of the hottest fluid, i.e., the higher temperature.

Thus, the Volume mixing ratio R (=Vhigh/Vlow) can equal to:

$$R = (T\text{final} - T\text{low})/(T\text{high} - T\text{final}) \qquad (2).$$

FIG. 1 (see below) shows examples of calculating volumes and temperatures.

According to an embodiment, it is possible to compensate for a certain temperature drop. For example, this can be implemented in a control system (of the apparatus), for instance by starting with water having a higher temperature (i.e. higher than a predetermined temperature T-high) or by heating the mixing chamber by means of a built-in heater.

This is particularly advantageous in case of (i.e., to compensate for) certain deviations that can be caused by some principles, for example including one or both of:
- a temperature drop due to the solving of formula milk in the water (i.e. mixing milk concentrate); and
- a principle that milk has a slightly different heat capacity (i.e., different from the heat capacity of water).

According to a further embodiment, the apparatus comprises a cooling system to cool the liquid, particularly to provide the liquid of a certain low temperature, the cooling system for example comprising a heat exchanger, Peltier element, heat sink, fan or zeolite-system.

Also, the apparatus can comprise a storage reservoir, for storage of liquid. Besides, the apparatus can comprise a mixing unit (for example a mixing chamber) for mixing the formula with the hot liquid. According to yet a further embodiment, the apparatus may comprise a mixing unit for mixing the powder formula with the liquid. The apparatus then preferably also comprises a powder formula storage for supplying powder formula to the mixing unit.

According to embodiments, the apparatus comprises a heater, for example a heating element, preferably a flow through heater. The heater can generate the warm or hot water during operation.

Also, according to an aspect, the apparatus may preferably comprise liquid inactivation means, for example a UV lamp, a filter and/or a heating device.

A further embodiment of the apparatus comprises a pump, particularly configured to pump the liquid, wherein the apparatus optionally comprises a flow meter.

According to another aspect of the invention, which aspect can be independent from the features of claim 1, there is provided an apparatus for producing a drink, for example milk, from mixing a powder formula with a liquid, preferably water, the apparatus preferably being an automated baby-milk machine, wherein the apparatus comprises a radiation system to create microbiologically safe liquid at adjustable temperatures, wherein the radiation system comprises a UV-unit.

For example, the radiation system can comprise an UV-lamp and a UV-transparent tube, such that during operation the tube contains the lamp with liquid flowing around, or the liquid flows through a tube with the UV-radiation coming from the outside. The apparatus may then further comprise a lamp function indicator, preferably a UV-dose indicator. Also, for example, advantageously, the apparatus comprises a reaction chamber containing the lamp and tube, wherein the reaction chamber is made of reflective material, for example aluminum.

According to another aspect of the invention, which aspect can be independent from the features of claim 1, there is provided an apparatus for producing a drink, for example milk, from mixing a powder formula with a liquid, preferably water, the apparatus preferably being an automated baby-milk machine, wherein the apparatus comprises a filter system to create microbiologically safe liquid at adjustable temperatures, wherein the filter system includes a micro, ultra or nano filter. In that case, according to a further embodiment, the filter may for example comprise a membrane, wherein the membrane has a pore size <1 μm, preferably <0.1 μm. Also, for example, the filter can comprise a coarse filter, for example active carbon, to filter large particles, for example to prevent blocking of the membrane.

According to a preferred embodiment, for example, the apparatus can be configured to measure lifetime of the filter, and preferably to generate a signal when the lifetime is reached.

Also, advantageously, en embodiment of the apparatus is configured to advise to change the filter when the apparatus has not been used for a certain time.

Besides, there is provided the use of an apparatus according to the invention for producing a drink, for example milk, from mixing a powder formula with a liquid, preferably water. Use preferably includes one or more of the following steps a)-d):

a) preparing a drink concentrate by mixing the amount of formula necessary for the total amount of drink in a certain amount of hot liquid, wherein the right amount of liquid of a certain low temperature is added to the concentrate in order to reach the end volume of the drink at a safe drinking temperature;
b) heating liquid supplied by a storage tank to provide hot liquid, wherein liquid supplied from the same storage tank is cooled to provide low temperature liquid;
c) irradiating liquid with UV radiation; and
d) filtering liquid utilizing a micro, ultra or nano filter.

Figure 2:
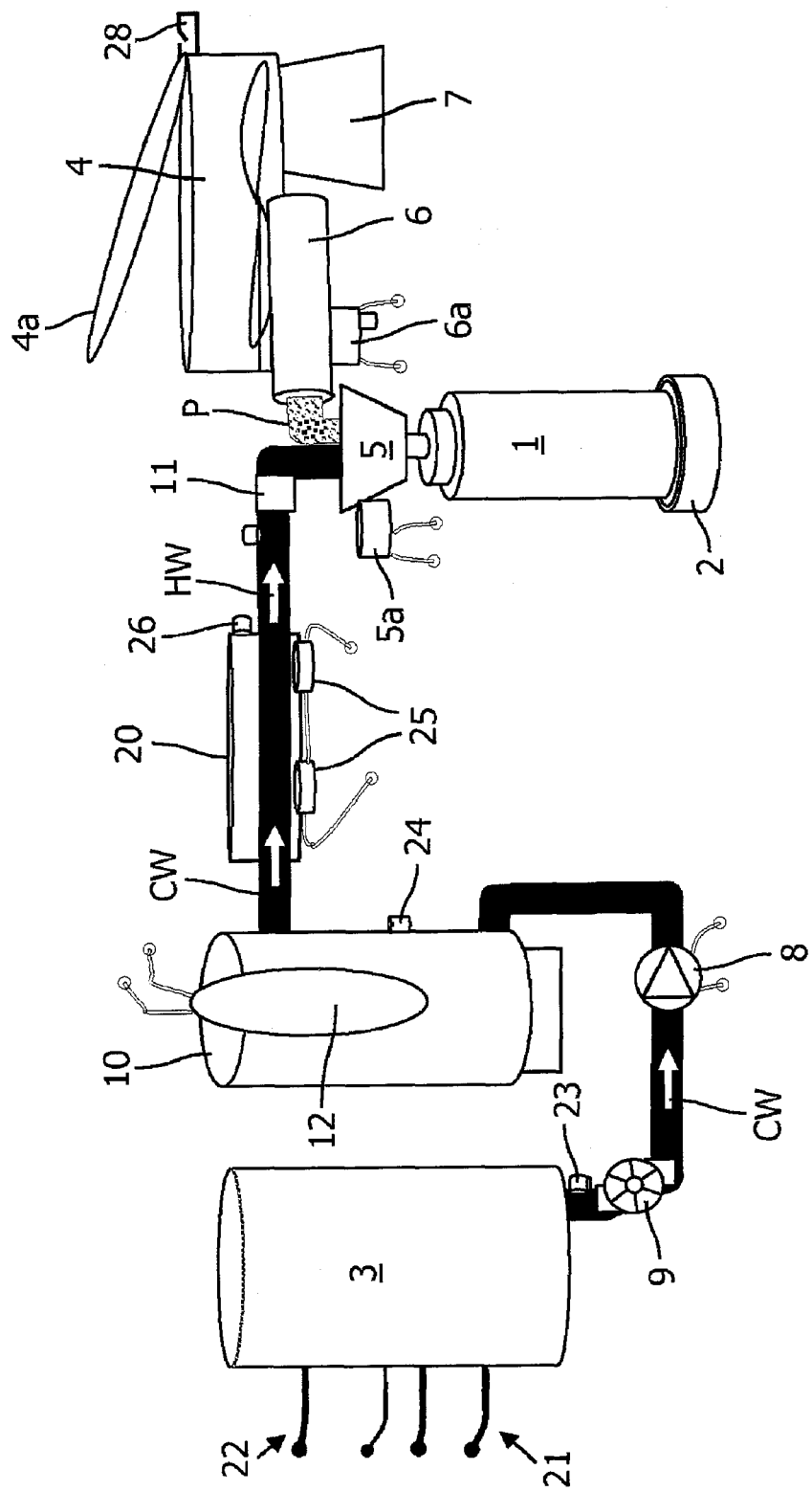
Figure 3:
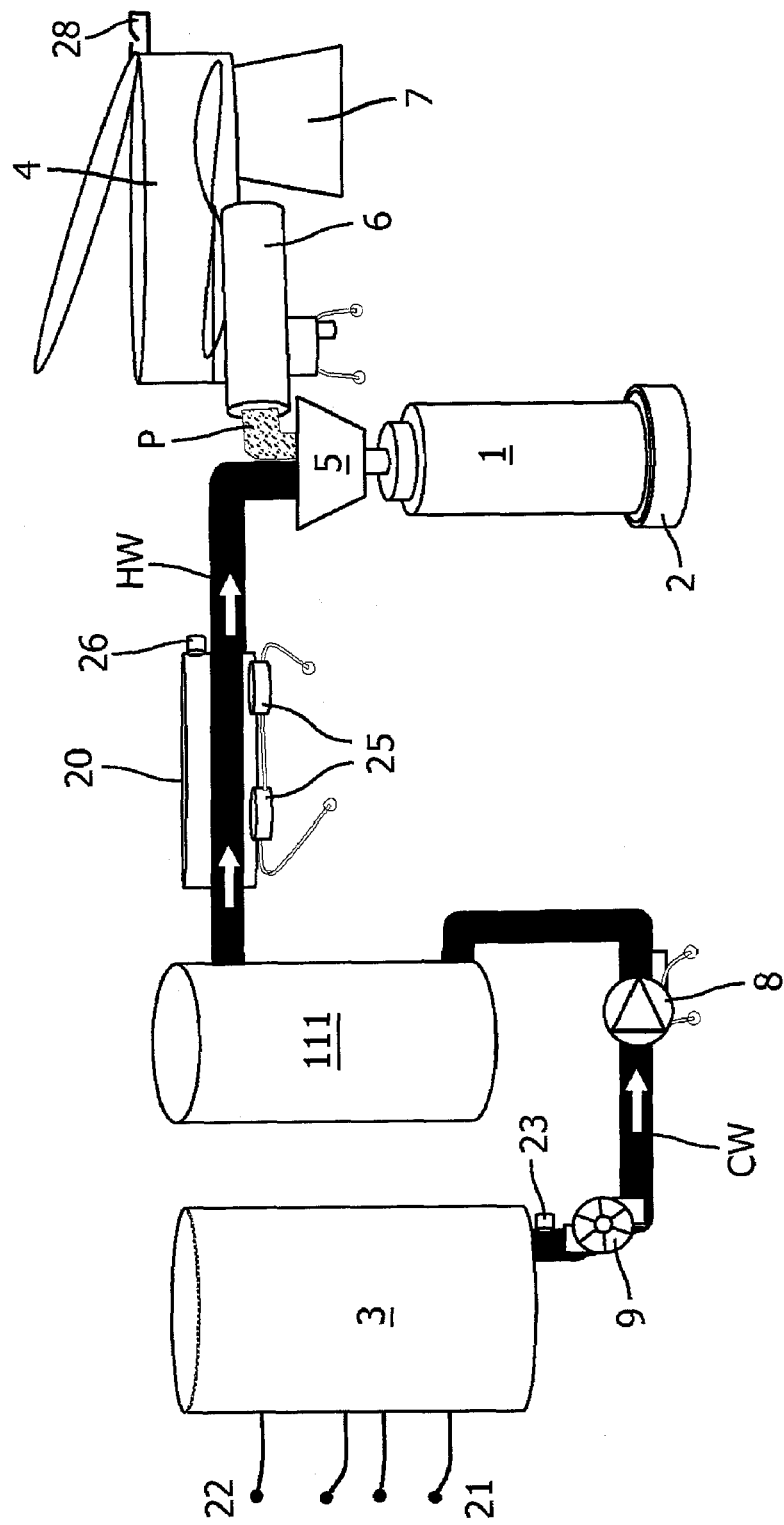
Figure 4:
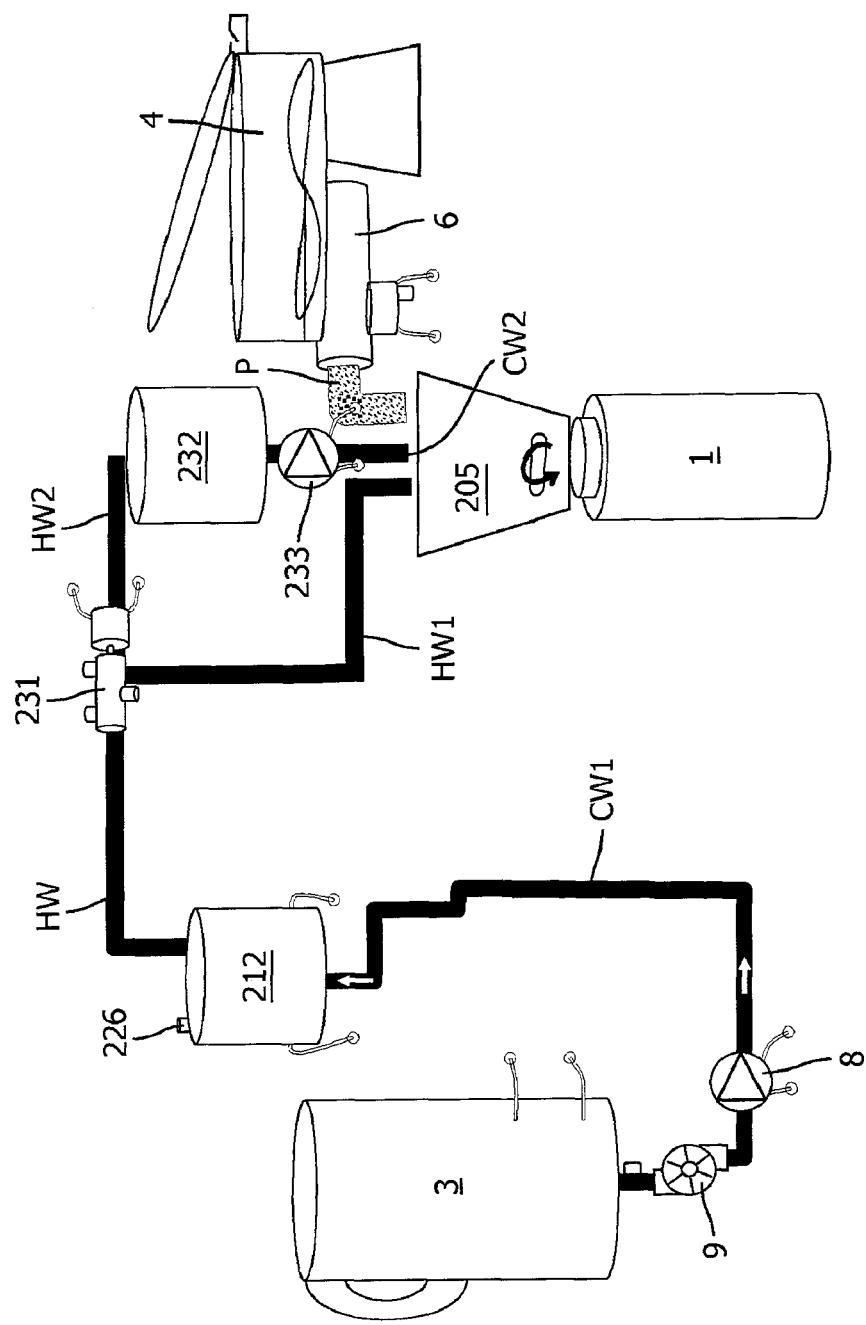
Figure 5:
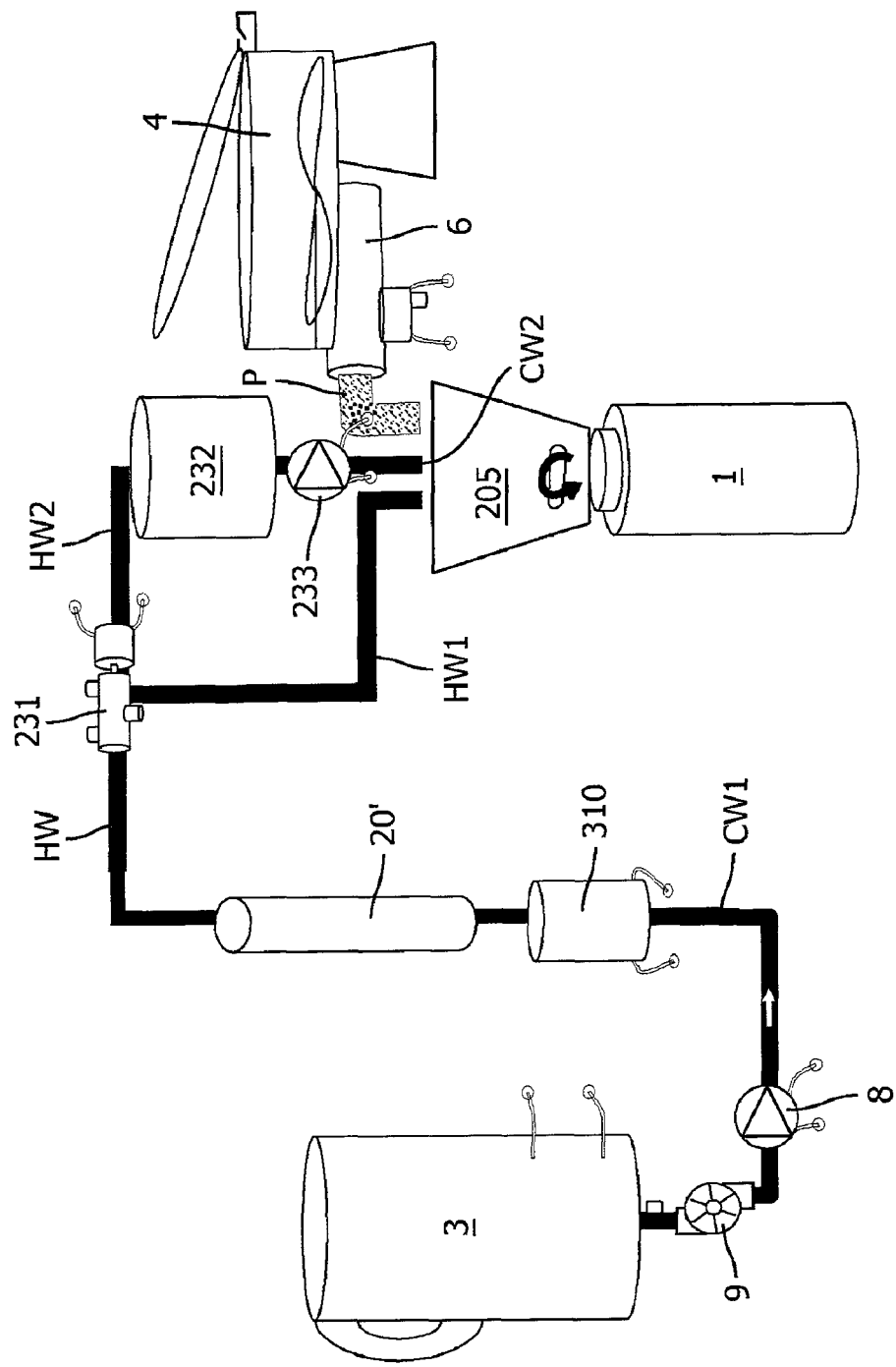
Figure 6:
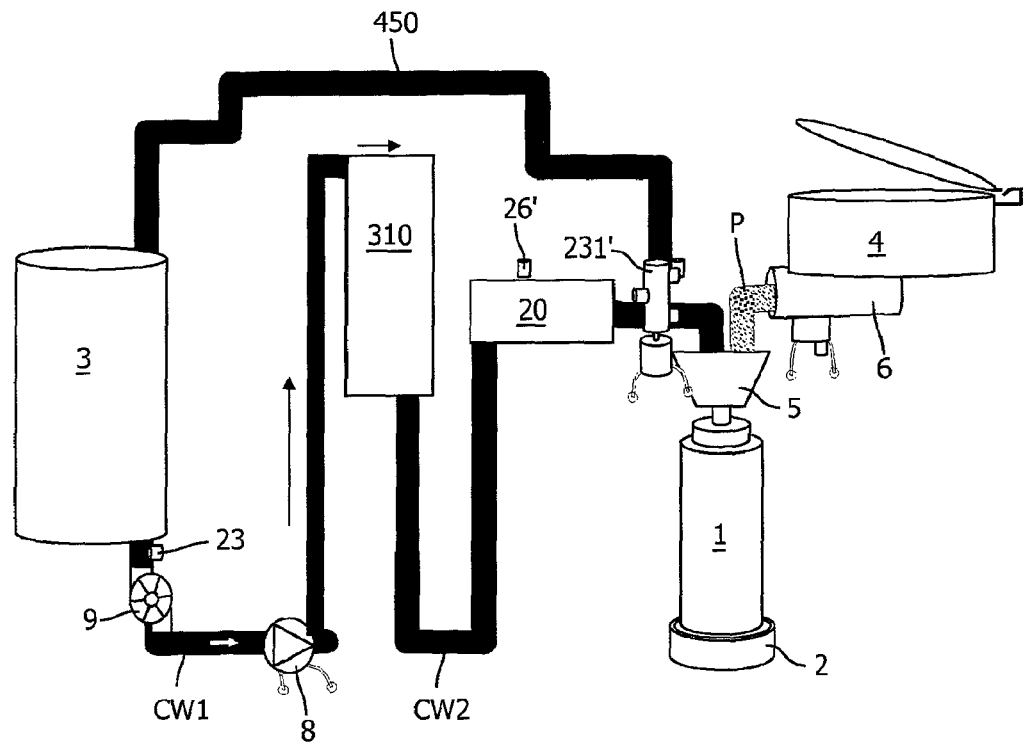
Figure 7:
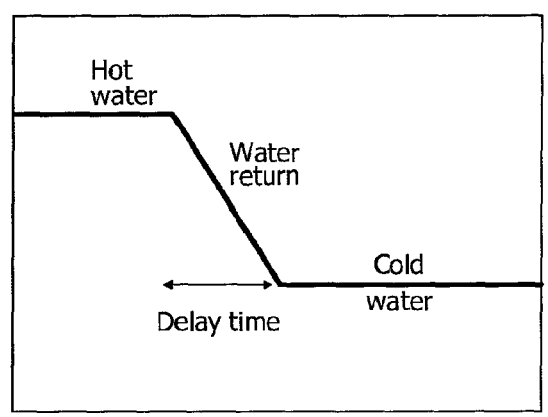

Embodiments of the invention will now be described, by way of example only, with reference to the accompanying schematic drawings in which corresponding reference symbols indicate corresponding parts, and in which:

FIG. 1A-1E depict diagrams of examples according to an embodiment of the invention;

FIG. 2 schematically depicts a first concept according to an embodiment of the invention;

FIG. 3 schematically depicts a second concept according to an embodiment of the invention;

FIG. 4 schematically depicts a third concept according to an embodiment of the invention;

FIG. 5 schematically depicts a fourth concept according to an embodiment of the invention;

FIG. 6 schematically depicts a further concept according to an embodiment of the invention; and FIG. 7 is a graph relating to the operation of a return tube concept.

FIG. 1 schematically depicts several examples of advantageous mixing processes, particularly being carried out by an apparatus for producing a drink. For example, according to a non-limiting embodiment, the apparatus is an automated baby-milk machine. Non-limiting, advantageous, embodiments of the apparatus are depicted in FIGS. 2-6, wherein each of these apparatus may carry out the method according to the invention, during operation. For example, according to a non limiting example, the apparatus is an automated baby-milk machine.

Particularly, as follows from FIG. 1, there can be provided a method to produce a drink, for example milk, from mixing a powder formula with a liquid, preferably water. Particularly, a drink concentrate can be prepared by mixing the amount of formula necessary for a total amount (Vfinal) of drink in a certain amount (Vhigh) of hot liquid (having a relatively high temperature Thigh), and to add the right amount (V low) of liquid of a certain low temperature (i.e., Tlow, which is a temperature lower than the mentioned high temperature) to the concentrate in order to reach the end volume (Vfinal) of the drink at a safe drinking temperature (Tfinal).

For example, above-mentioned formula 2 provides a means that can be used by the apparatus (for example by a control unit thereof) to determine or calculate a mixing ratio R (=Vhigh/Vlow) at given temperatures Tfinal, Thigh and Tlow. As is mentioned above, this calculation or determination may also take into account certain deviations, for example due to a solving of formula milk in the water (i.e.

mixing milk concentrate), and/or due to the principle that milk (or in particular the drink concentrate) has a different heat capacity than water.

For example, FIGS. 1A-1E show several examples of mixing cold water Q with hot milk concentrate HMC to obtain milk having a safe drinking temperature of about 40 degrees C. Herein, the hot milk concentrate HMC has already been prepared from mixing an amount of formula (necessary for a total drink amount) in a certain amount (Vhigh) of hot liquid.

In FIG. 1A, the temperature of the cold water Q is 0° C. and the temperature of the hot milk concentrate HMC is 70° C. To achieve the desired final temperature (of about 40° C.), thus, the apparatus uses a mixing ratio R1 of 3:4.

Figure 1B:
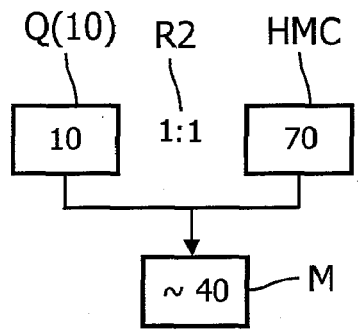

In FIG. 1B, the temperature of the cold water Q is 10° C. and the temperature of the hot milk concentrate HMC is 70° C. To achieve the desired final temperature (of about 40° C.), thus, the apparatus uses a mixing ratio R2 of 1:1.

Figure 1D:
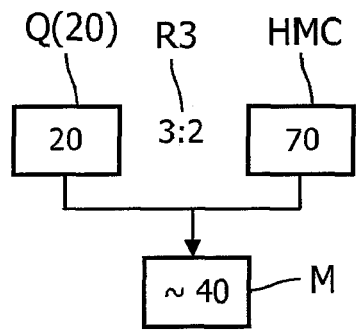
Figure 1C:
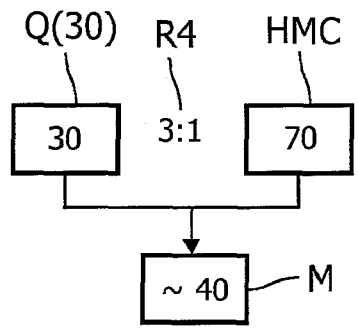

In FIG. 1C, the temperature of the cold water Q is 20° C. and the temperature of the hot milk concentrate HMC is 70° C. To achieve the desired final temperature (again about 40° C.), the apparatus uses a mixing ratio R3 of 3:2.

In FIG. 1D, the temperature of the cold water Q is 30° C. and the temperature of the hot milk concentrate HMC is, again, 70° C. In this case, the apparatus uses a mixing ratio R4 of 3:1.

Figure 1E:
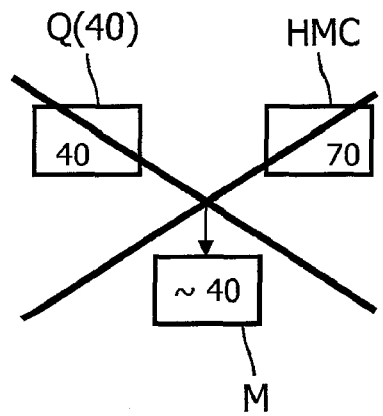

In FIG. 1E, the temperature of the cold water Q is 40° C. and the temperature of the hot milk concentrate HMC is 70° C. In this case, the apparatus can determine that it will not be possible to provide the drink at the desired drinking temperature, and may generate an error signal.

For example, during operation of the apparatus, different embodiments may be possible. A method of preparation of the drink can include the following steps I-IV (which steps can be carried out in a suitable order, which order does not have to be the following order):

I) add hot water (for example having a high temperature Thigh in the range of 60-80 degrees C.) in a mixing location, and preferably start stirring the water to create a water vortex; the volume (of the water to be added) may be based on a temperature (Tlow) of unheated water (for example present in the system or apparatus, for example in cold water container or reservoir 3, see below);
II) add powder P (to the hot water);
III) stir (i.e. the water and powder P; stirring is preferably done while adding the powder to the water; in this way, the above-mentioned hot milk concentrate HMC can be obtained); and
IV) add cold (for example cooled or unheated, and preferably sterilized) water.

In the above, for example, temperature control may be done by adding the right mix of hot and cold water or by heating up the water to the exact temperature. Also, for example, addition of cold water can be done in the mixing area (i.e., an area where the powder P is added to the hot water), or alternatively elsewhere, for example in a bottle 1.

Also, for example, the joining or mixing of hot milk concentrate HMC on one hand and the cold water on the other hand can be carried out in various ways. For example, a predetermined amount prepared hot milk concentrate HMC (having the volume Vhigh) can be added to a predetermined amount of the cold water (having the volume V-low). Alternatively, a predetermined amount of the cold water (having the volume V-low) can be added to a predetermined amount prepared hot milk concentrate HMC (having the volume Vhigh). Besides, for example, the predetermined amount prepared hot milk concentrate HMC and the predetermined amount of the cold water can be joined in a certain mixing area in a different manner, for example in alternating fashion (wherein several parts of the hot milk concentrate amount and several parts of the cold water amount are brought alternating into the mixing area), or simultaneously.

FIG. 2 schematically shows a first apparatus embodiment, which apparatus can be configured to carry out the above-described method. However, the apparatus can also be operative to carry out a different method, for example a method wherein a drink concentrate is not being prepared by adding any amount of liquid of a certain low temperature to a drink concentrate in order to reach a drink at a safe drinking temperature (Tfinal). For example, the apparatus can also carry out a method including mixing the amount of formula necessary for a total amount (Vfinal) of drink in a total amount (Vfinal) of liquid, to prepare the drink having the total amount (Vfinal) and the desired drinking temperature (Tfinal).

For example, the apparatus of FIG. 2 can be configured to carry out a first concept, which concept includes a water inactivation method: for example, (prefiltered) UV or ultra-filtration, water heating by a flow through heater, and for example without active cooling. The first concept can include an active mixing unit: for example a mixing chamber 5 with stirring device, a jug with stirring device, a bottle with stirring device.

Particularly, the apparatus shown in FIG. 2 can include a storage reservoir or tank 3, "storage water", for example having a capacity of 1 liter or a different capacity. The reservoir 3 can contain liquid, for example cold liquid, and particularly water. For example, the reservoir 3 can be configured to be refillable, and may be removable from a remaining part of the apparatus (for example to be refilled).

According to a further embodiment, for example, in case of a removable liquid supply tank (or reservoir) 3, the apparatus can include a "tank present" indicator 21. For example, the apparatus can be configured to operate only, in the case that "tank present" indicator 21 indicates presence of the reservoir 3.

According to a further embodiment, for example, the apparatus can include a "tank almost empty" indicator 22. For example, this indicator 22 can generate a signal when the reservoir 3 contains less than a predetermined threshold amount of liquid (for example an amount that is necessary to produce at least one full drink portion), for example to notify a user that liquid has to be refilled. Also, for example, the apparatus can be configured to operate only, in the case that "tank almost empty" indicator 21 does not indicate emptiness of the reservoir 3 (i.e., the reservoir contains sufficient liquid for producing at least one drink portion).

Also, the apparatus can include a (second) reservoir 4, "storage powder", configured to hold the formula powder P. The volume-capacity of this reservoir can be smaller than the volume-capacity of the liquid reservoir 3 (as a non-limiting example, the storage powder 4 can have a capacity of 0.4 liter). In the present embodiment, the powder reservoir 4 can comprise a switch 28, for example being configured to detect opening of an optional cover 4a of the reservoir 4. Also, the apparatus may include a load cell 7, for example a load cell 7 being arranged at the powder reservoir 4 (see FIG. 2).

The apparatus can include a holder 2 configured to hold a bottle 1 (for example a baby-drinking bottle, or another drink receiver 1). For example, the holder 2 can comprise a leakage tray. Also, the holder 2 can comprise an adjustable stand.

According to a further embodiment, the apparatus comprising a mixing unit 5, particularly a mixing chamber 5, for mixing the formula powder P with hot liquid to obtain a hot drink concentrate, and for example (but not necessarily) for subsequently mixing the hot drink concentrate HMC with the cold liquid (i.e. cold water, in the present embodiment). The present apparatus can include a mixing motor 5a, which can be coupled to a mixer of the mixing chamber/unit 5, to provide active mixing.

In this case, the powder formula storage 4 is arranged for or comprises means for supplying the powder formula P to the mixing chamber 5. To this aim, for example the apparatus can be provided with a powder transport device 6, for example including a screw 6, comprising for example a respective motor and encoder 6a (which can be configured to drive the screw 6 to transport a well defined amount of powder P to the mixing unit 5).

Preferably, the apparatus according apparatus comprises at least one heater, for example a heating element, preferably a flow through heater. The embodiment of FIG. 2 comprises a flow through heater 20, which is located upstream with respect to the mixing unit 5. For example, a cold liquid conduit CW which extends from the liquid reservoir 3 (and which can receive liquid from that reservoir 3) can be provided with the flow through heater 20. A liquid duct part that extends from the flow through heater 20 to (a liquid receiving opening of) the mixing unit 5 is a hot liquid conduit HW. The flow through heater 20 is configured to generate hot liquid from liquid flowing there-through. For example, the flow through heater can include a thermal cut-off device or switch ("TCO") 25, as will be appreciated by the skilled person.

Preferably, the apparatus comprises one or more liquid inactivation means, for example a UV lamp, a filter and/or a heating device.

The embodiment of FIG. 2 comprises a liquid inactivation means, including an optional radiation system 10, 12 to create microbiologically safe liquid at adjustable temperatures, wherein the radiation system comprises a UV-unit 10, 12. For example, the radiation system comprises an UV-lamp 12 and a UV-transparent tube (surrounding the lamp), such that during operation the tube contains the lamp with liquid (being supplied thereto via the cold liquid conduit CW) flowing around. In an alternative embodiment (not shown) the radiation system comprises an UV-lamp 12 and a UV-transparent tube (surrounding the lamp), such that during operation the liquid flows through the tube with the UV-radiation coming from the outside.

According to a further embodiment, the apparatus comprising a lamp function indicator, preferably a UV-dose indicator 24 (i.e., UV sensor 24).

For example, the present embodiment includes a reaction chamber 10 ("UV tank 10") containing the lamp and tube 12, and the optional UV sensor 24. The reaction chamber 10 can be provided with an upstream liquid supply part to receive liquid from an upstream liquid conduit CW, and a downstream liquid discharge part to pass irradiated liquid to a downstream liquid conduit CW. Preferably, the reaction chamber 10 (and more preferably at least its inner side, which side is faced towards the lamp 12) is made of reflective material, for example aluminum (for example to reflect at least part of the UV radiation that is emitted by the lamp 12).

In addition, the embodiment of FIG. 2 can comprise a liquid inactivation means, including an optional filter 11. For example, good results can be obtained when the filter is a Calcium lumps filter 11 (containing for example Calcium lumps to filter the hot liquid). In the present embodiment, this filter 11 is arranged downstream with respect to the heater 20 and upstream with respect to the mixing unit 5. The filter 11 can be part of the respective hot liquid conduit HW, and can filter (hot) liquid that flows to that conduit HW. Alternatively, for example, the optional filter 11 can be a micro, ultra or nano filter (see also for example the embodiment of FIG. 3).

Also, the present apparatus example comprises a pump 8, particularly configured to pump the liquid. The present pump 8 is located downstream of the liquid reservoir 3, for example upstream with respect of the mixing unit 5 (particularly upstream with respect to the heater 20, and particularly upstream with respect to the liquid inactivation means 10, 11, 12). The pump 8 can be controlled to pump well-defined amounts of liquid through the liquid conduit system CW, HW, towards the mixing unit 5.

Also, the apparatus can optionally comprise a flow meter 9, to detect or measure flow of liquid, flowing to the mixing unit 5. The present flow meter 9 is located downstream of the liquid reservoir 3, and for example upstream with respect of the mixing unit 5 (particularly upstream with respect to the heater 20, and particularly upstream with respect to the liquid inactivation means 10, 11, 12).

Besides, the apparatus can include one or more temperature sensors, to detect/measure the temperature of liquid. In the present embodiment, there is provided a first temperature sensor 23, arranged to detect the temperature (Tlow) of the cold liquid. For example, the first temperature sensor 23 can be part of the liquid reservoir 3, of be located at or near a discharge part of that reservoir 3, or it can be coupled to a cold liquid conduit part CW.

Also, a second temperature sensor 26 can be provided at or near the heater 20, to detect the temperature (i.e. Thigh) of the liquid at/near the heater 20.

Preferred examples of operation of the apparatus show in FIG. 2 have already been described above. For example, during operation, a bottle 1 can be placed on the holder 2. A certain amount of hot liquid (for example water) is generated by the apparatus, and supplied to the mixing unit 5. The liquid is pumped from the reservoir 3 through the cold liquid duct CW, radiation system 12, heater 20, hot liquid duct HW, and second filter 11, before arriving at the mixing chamber 5.

For example, during operation, the radiation system 10, 12 can be kept active during a certain time period, such that the system only discharges liquid that is inactivated to a predetermined level (for example substantially full deactivation).

The heater 20 can be activated during a certain heating period, before and/or during liquid flow (through the heater 20), to generate the hot liquid (from liquid received from the radiation system). After a certain amount of hot liquid has been generated, for example, the heater 20 can be deactivated. The above-mentioned temperature sensors 23, 26 can detect the respective (low and high) temperatures of the liquid, during operation.

Also, a certain amount of powder P is fed to the mixing chamber by the powder feeding system (i.e., including the powder compartment 4 and controllable screw device 6).

The hot liquid and powder are mixed to form a hot drink concentrate (for example a hot milk concentrate HMC) by the mixing unit 5, and the resulting concentrate is fed into the bottle 1. Preferable, an amount of cold liquid is also fed to the bottle 1, for example before preparation and/or feeding the hot drink concentrate to the bottle 1, during preparation and/or feeding the hot drink concentrate to the bottle 1, and/or thereafter (as has been explained in the above).

For example, supply of cold liquid (to the bottle 1) can include activation of the pump 8 to pump liquid from the reservoir 3, during a time of the heater 20 not being active (for example before activation, or after deactivation, of the heater 20).

Amounts of powder P, hot liquid and optional cold liquid depend for example on a desired final amount (final volume V final) of drink that is to be produced, and the final temperature (for example a safe drinking temperature Tfinal) of the drink. As is described before, for example, the apparatus can be configured to control the pump 8, heater 20, mixing unit 5, 5a and powder supply system 4, 6 such, depending on detected liquid temperatures (sensed by the sensors 23, 26) and predetermined Tfinal and Vfinal parameters, to prepare the drink concentrate by mixing the amount of formula necessary for the total amount of drink in a certain amount of hot liquid, and to add the right amount of liquid of a certain low temperature to the concentrate in order to reach the end volume Vfinal of the drink at a safe drinking temperature Tfinal.

For example, the apparatus can include a controller or control unit (not shown as such), that is configured to process data (for example sensor signal data of the sensors 9, 21, 22, 24, 26, 28) and control various components 3, 8, 10, 20, 25, 5, 6 of the system, to achieve an above-described operation.

For example, the control unit can controls the system, for example, to control sequence liquid flow, powder flow, one or more temperature controls, volumes, mixing, etc.

Also, for example, the apparatus can include a user interface, to provide user interaction with the apparatus, for example a user interface including a start button (to active the apparatus), a keypad, (optionally touchscreen-) display, voice-controlled interface, or different type of apparatus handling means. For example, the user interface can be part of the controller.

FIG. 3 shows an embodiment of an apparatus, which differs from the embodiment shown in FIG. 2 in that a filter system 111 has been included (instead of the above-described radiation system).

For example, the filter system 111 can be a filter system that is configured to create microbiologically safe liquid at adjustable temperatures. Preferably, the filter system 111 includes a micro, ultra or nano filter.

According to a further advantageous embodiment, the filter (or filter system 111) comprises a membrane, wherein the membrane has a pore size <1 μm, preferably <0.1 μm. For example or in addition, the filter system can comprise a coarse filter, for example active carbon, to filter large particles, for example to prevent blocking of the mentioned membrane (micro, ultra or nano filter).

According to yet a further embodiment, the apparatus is configured to measure lifetime of the filter 111 (for example micro, ultra or nano filter), and preferably to generate a signal when the lifetime is reached. Also, the apparatus can be configured to advise to change the filter (for example micro, ultra or nano filter) when the apparatus has not been used for a certain time.

FIG. 4 depicts an embodiment of the apparatus, which differs from the embodiment of FIG. 2 in that the apparatus is provided with a cooling system to cool the liquid, particularly to provide the liquid of the certain low temperature (T low). For example, the cooling system can comprise a heat exchanger, a Peltier element, heat sink, fan or zeolite-system.

In FIG. 4, as an example, the cooling system 232 can comprise a Peltier element system, or a refrigerator-system. In this embodiment, the cooling system 232 is located upstream with respect to the mixing unit 205, and downstream with respect of the liquid reservoir 3. Also, a heater (for example, having a hot liquid reservoir, or a flow through heater) 212 (optionally provided with a first temperature sensor 226) is located upstream with respect of the cooling system 232. For example, the cooling system can include a cooling system pump 233.

For example, the apparatus can comprise a valve unit, for example a three way valve 231, as in the FIG. 4 embodiment. In this case, an inlet of the valve unit received hot liquid from a hot liquid conduit HW. A first outlet of the valve unit 231 discharges liquid into a first hot liquid conduit HW1, towards the mixing unit 205. A second outlet of the valve unit 231 discharges liquid into a second hot liquid conduit HW2, towards cooling system 232.

Besides, in the embodiment of FIG. 4, the mixing unit 205 can include an active mixing area. For example, according to an embodiment of the invention, there can be provided an active mixing unit 205, that can be provided with a mixing chamber including a stirring device, and/or a jug with stirring a device, and/or a bottle 1 with a stirring device.

Operation of the system of FIG. 4 is similar to the above-described operation, and includes the use/control of the vale unit 231 and the cooling system 232 to produce the desired amount of drink (V final) at the desired temperature (T final).

During operation, the pump 8 pumps liquid from the reservoir 3 via a first cold liquid conduit CW1, to the heater 212. The heater can be activated during desired time periods to generate heated (hot) liquid. Optionally, the heater 212 is configured to always discharge hot liquid (having the aforementioned high temperature T high) during operation of the apparatus.

During operation, the valve unit 231 can be controlled to be in a first valve position, (for example hot) such that liquid discharged by the heater 226 (via hot liquid conduit HW, the liquid particularly being heated by the heater 226) is fed directly to the mixing unit 205.

Also, the valve unit 231 can be controlled to be in another, second, valve position, such that liquid discharged by the heater 226 (via hot liquid conduit HW) is fed indirectly to the mixing unit 205, via the cooling system 232. In that case, the liquid can be/is cooled by the cooling system, to achieve a desired low liquid temperature T low, before entering the mixing unit 205 (via a second cold liquid conduit CW1). In that case, for example, liquid fed to the cooling system 232 can still have a relatively high temperature (for example due to a temperature of the upstream heater system 212, or due to the heater 212 being still activated).

FIG. 5 depicts an alternative embodiment, which differs from the FIG. 4 embodiment, in that the first cold liquid conduit CW! Is provided with a radiation system, for example UV unit 310 and (downstream thereof) a flow through heater 20'.

FIG. 6 shows an example of the apparatus, which differs from the embodiment shown in FIG. 5 in that an inlet of the valve unit 231' is configured to receives liquid that is discharged by a heater (flow trough heater) 20. A first outlet of the valve unit 231' discharges liquid into to the mixing unit 5. In this case, a second outlet of the valve unit 231' discharges liquid into a return conduit (return pipe) 450, which return conduit is configured to feed the liquid back to the liquid reservoir 3

Also, the FIG. 6 embodiment includes an optional radiation unit (for example UV-unit) 310.

For example, the "return tube" concept of FIG. 6 can include the liquid inactivation method, for example by (optionally prefiltered) UV light (by the UV system 310), and by liquid heating by the heater 20.

In the FIG. 6 embodiment, preferably, a temperature control can includes: an automated baby-milk machine wherein a mixing principle of hot (for example T=37-80° C.) water is followed by application of cold (for example T=0-37° C.) water. The return tube 450 can be implemented when a delay time between hot and cold is too long. This is indicated in the graph of FIG. 7.

For example, during operation of the FIG. 6 embodiment, the three way valve 231' first allows a predetermined volume (V high) hot water to pass to the mixing unit 5, during a heater operation water heating period.

Then, the heater 20 s deactivated, and during a subsequent delay time (DT), water that is discharged from the heater 20 (but is still relatively warm) is being returned to the reservoir 3 via the return system 450 (to that aim, the valve unit 231' is in its second state). When it is determined (for example by a temperature sensor 26'), that the water at the heater (or the heater) has cooled down to a certain desired cold water temperature, the valve unit 231' is switched to its first state, to allow a predetermined volume (V low) of cold water to pass to the mixing unit 5. Again, as in the above embodiments, Also, according to a temperature control embodiment, the hot concentrate is cooled down with cold water from an actively cooled water reservoir (for example cooling with Peltier).

In any of the above-mentioned embodiments, a variation is to cool the storage container (reservoir 3) instead of having a separate cooling container. In that case, for example, a return tube 450 (see FIG. 6) is preferably applied as well.

In any of the above-mentioned embodiments, for example, a liquid inactivation method can include: water heating (a certain time at 70 degrees C. or higher) by a heating device.

Also, in any of the above-described embodiments, there can be achieved a temperature control in the mixing unit (or chamber) 5, wherein (in the mixing chamber) temperatures between 0-95 degrees C. can be achieved by pumping/adding a hot and a cold flow together in the mixing chamber.

Advantages of embodiments of the invention include a relatively compact apparatus, relatively inexpensive, comprising relatively little components. Also, the present invention can generate the drink swiftly, and in a very safe manner, wherein liquid can be dosed very accurately (thus preventing loss of liquid).

Embodiments of the invention can provide a system for quick delivery of purified water (for example UV-purified water) at adjustable temperatures.

For example, as is mentioned above, in order to deliver a bottle of milk at 37 C a method can be chosen to prepare a concentrate at a high temperature (greater than or equal to 60° C.) and add colder water afterwards. Preferably, at least the colder water is "inactivated", i.e. the removal or destruction of harmful microorganisms (contrary to sterilization that leads to the complete removal or destruction of all life forms). Normally water is made potable inactivated by boiling.

In a baby milk machine (see embodiments of FIG. 2-6, for example), milk can be prepared between temperatures of 20-90 degrees, preferably between 30-70 degrees. The milk should be delivered at drinking temperature (20-45 C), preferably at 37 C.

Powder Infant Formula (PIF) manufacturers advise avoiding the risk of giving the milk which is too hot and want to give the user convenience (no waiting times, no hassle). The usual way to inactivate potable water is by boiling. However to cool down, water takes a lot of time (about 2 hours or more—passive). To create an automatic quick cool down time which is below 15 minutes (in the appliance) a unit is desired which is expensive, difficult to control, and big. Moreover, this is highly energy ineffective. An inactivation method which does not heat up the water is therefore preferred. Several embodiments described above solve, or at least alleviate, this problem.

As follows from the above, preferably, there can be provided a method to prepare a milk concentrate at a requested (high) temperature, wherein sufficient water of a certain temperature is added to reach a final drinking temperature (preferably 37 degrees). For this method, quick switching between cold and hot water is preferred to have the milk as short as possible at high temperature. The longer the milk is at a high temperature the more this leads to a decrease in milk quality, both nutrition and microbial wise. This problem is also solved, or at least alleviated, by various embodiments that have been described above and that are shown in FIG. 2-6, particularly by providing a system to create microbiologically safe water at adjustable temperatures consists of a UV-unit, a heating element, preferably a flow through heater, a pump, a flow meter and a water reservoir.

For example (see FIG. 2, 6), the UV-unit can consist of a lamp 12, a UV-transparent tube—preferably quarts—, a sensor 24, a reaction chamber 10, 310 and electronic control (not depicted as such).

For example, in above-mentioned embodiments, during operation, the UV lamp 12 can radiates a UV dosage of preferably at least 16 J/cm^2 (class B) or ≥40 mJ/cm^2 (class A) to comply with the NSF 55 standard (Ultraviolet microbiological water treatment systems). The latter (≥40 mJ/cm^2) is required to fulfill the European Standard EN 14897 (Water conditioning equipment inside buildings—Devices using mercury low-pressure ultraviolet radiators—Requirements for performance, safety and testing).

The sensor 24 can be used to measure the light emission from the UV-lamp to check whether the UV-dose is still sufficient. A UV-sensor 24 is the most ideal, however a lamp function indicator 24 in another area of the light spectrum may suffice (e.g. a sensor for visible light).

As is mentioned above, the reaction chamber 10, 310 can comprise the UV-transparent tube and UV lamp 12 is preferably made of reflective material, for instance (anodized) aluminum.

As addition to the system, a coarse filter, for example a coal filter, can be placed before the UV-unit 10, 12, 310 to filter out bigger particles and to decrease turbidity below 1 NTU—preferably 0.1 NTU. This increases the performance of the UV-reactor.

In above-mentioned embodiments, a heater 20—preferably a flow-through heater—can heat the liquid (for example water) up to 100° C. For the automated baby-milk machine embodiments, particularly, temperatures between 20-80° C. will be set to enable the hot concentrate milk mixing procedure. Additionally, the heater 20 can heat liquid to a higher temperature (for example higher than 80° C.) to flush the system with hot water to inactivate any biofilm formation in the tubings.

In the above-mentioned embodiments, for example to control the flow/volume of liquid, a flow-meter 9 and/or accurate pump 8 can be used.

Preferably, in the above-mentioned embodiments, liquid conduits (tubings) after the filter are heat resistant and made of material which prevents forming of biofilm (e.g. sediment formed by dead micro-organisms).

According to a further embodiment of the apparatus according to the invention, flow-control is preferred. In other words: it is preferred that the pump 8 delivers an adjustable flow (during operation).

However, for other beverage applications (i.e. other than producing milk) flow-control is not necessarily required.

In above-mentioned, embodiments, the UV lamp 12 or the UV reactor/tank 10 might be replaceable. For example, a mentioned coarse filter (for example a coal filter) might be added in front of the UV reactor 10, 310 to remove larger particles, thereby decreasing turbidity.

According to an embodiment, the apparatus of the invention can be configured to:
- add hot inactivated water (37-80° C.) in the mixing location (mixing unit 5) and preferably to start stirring to create a liquid vortex (other mixing principles are possible),
- add powder (simultaneously) to the hot inactivated water, mix, and
- add cold (0-37° C.) water.

For example, temperature control of the end product can be done by adding the right amount of cold water to the hot concentrate. The cold water can be heated by the heater if necessary. In above-described embodiments, adding of cold water can be done in the mixing area 5 or in the bottle 1.

Above-described embodiments can also provide a fast cool down of milk prepared at a high temperature.

Again, for example, as follows from the above, powdered infant Formula can be contaminated with a bacteria, like *E. saka-zakii*. In order to deliver a bottle of milk at 37 C a method is chosen to prepare a concentrate at a high temperature (60° C.) and add colder water afterwards. Preferably, at least the colder water is "inactivated", i.e. the removal or destruction of harmful microorganisms (contrary to sterilization that leads to the complete removal or destruction of all life forms). Normally water is made potable inactivated by boiling (in manual preparation).

For example, in the baby milk machine, milk can be prepared between temperatures of 20-90 degrees C., preferably between 30-70 degrees C. The milk should be delivered at drinking temperature (20-45 degrees C.), preferably at 37 degrees C. Powder Infant Formula (PIF) manufacturers advice to avoid the risk of giving the milk too hot and to give the user convenience (no waiting times, no hassle).

Normally inactivate potable water is sterilized by boiling, however. However to cool down water this takes a lot of time (~2 hours or more—passive method to hand warm, ~½ hour to 60° C.). To create an automatic a quick cool down time which is below 15 minutes (in the appliance), until the present invention, an expensive, big and difficult to control cool down unit has to be applied. Moreover, the prior art system and methods are highly energy ineffective. An inactivation method which does not heat up the water is therefore preferred.

As follows from the above, for example, a preferred method is to mix milk at higher temperature and to deliver it at lower temperature. For this method, quick switching between cold and hot water is required to have the milk as short as possible at high temperature. The longer the milk is at a high temperature the more this leads to a decrease in milk quality, both nutrition and microbial wise.

Embodiments of the invention can create microbiologically safe water at adjustable temperatures consists of a micro, ultra or nano filter, a heating element, preferably a flow-through heater, a pump, a flow-meter and a water reservoir.

For example, the currently chosen filter 111 (see FIG. 3) can consists of a UF (ultra filtration)-membrane and active carbon. The membrane of the membrane filter 111 can have a pore size <1 μm, preferably <0.1 μm to physically block all microorganisms like bacteria (~1 μm), cysts (~10 μm), and viruses (~0.1 μm). The active carbon can filter the large particles, e.g. to prevent blocking of the membrane. Optionally, the active carbon is left out, for example to be replaced by another coarse filter, or to have no pre-filter at all. This depends on the quality of the entry-water.

Preferably the filter 111 (see FIG. 3) has a lifetime of 180-200 days or 2100+/−100 liters. The lifetime can be extended or decreased depending on the final specification. For example it can be intended to replace the filter after ~1 year, which is approximately the time which is expected for the certain apparatus embodiments (for example an automated baby-milk machine to serve milk for 1 child).

For example, in embodiments of the invention (see FIG. 3), the lifetime of the filter 111 can be measured by measuring the flow (of liquid flowing through the filter 111) electronically or mechanically. When the lifetime is reached, a signal can be generated by the apparatus, preferably electronically. Also, when the appliance has not been used for a certain time the appliance can give the advice to change the filter.

For example, a currently used filter can purify water according NSF EPA 231 (microbiological water purifiers): 6 log reduction bacteria, 4 log reduction virus, 3.3 log reduction cysts. By choosing the right pore size, the will be largely exceeded if they are impenetrable for bacteria (~1 μm), viruses (~0.1 μm), protozoa (10 μm), and algae (10 μm). Slightly different levels of purification are therefore possible.

Preferably, according to an embodiment, a mentioned water (active coal) filter can purify (required safety factor 100%) water according NSF 53 (Drinking water treatment units—Health effects) for agreed chemical substances: Pb, Atrazine (Pesticides), Ethynyl-estradiol (Medicine residue), Bisphenol (Hormones), Chloroform (VOC's). Another element that may be eliminated by active coal is chlorine, that may partially have been removed by boiling otherwise.

As mentioned, the flow-meter can measure the lifetime of the filter. Other methods to measure the lifetime are also possible, for instance measuring the volume by knowledge of the pump characteristic, measuring the time of operation by an electrical or mechanical control unit.

As follows from the above, it is preferred that the pump delivers an adjustable flow. For achieving an ultimate temperature control, a return tube 450 after the heater 20 may be preferred (see FIG. 6).

According to an embodiment, the ultra filtration unit (or filter) 111 can be replaceable. A coarse filter (for example a coal filter) might be added in front of the Ultra Filter unit to remove larger particles or turbidity.

It is to be understood that in the present application, the term "comprising" does not exclude other elements or steps. Also, each of the terms "a" and "an" does not exclude a plurality. Any reference sign(s) in the claims shall not be construed as limiting the scope of the claims.

LIST OF FEATURES 1 bottle
2 leakage tray and adjustable stand
3 storage water (for example 1 liter)
4 storage powder (for example 0.4 liter)
5 mixing chamber
5a mixing motor
6 screw
6a motor+encoder
7 load cell
8 pump
9 flow-meter
10 UV tank
11 Calcium lumps filter
12 UV lamp
20 flow through heater
21 tank present
22 almost empty indicator
23 temp 1 sensor
24 UV sensor
25 TCO
26, 226: Temp 2 sensor
28 Switch
P powder
CW, CW1, CW2 cold water conduits
HW, HW1, HW2 hot water conduits
111 membrane filter
212 Heater
231 three way valve
232 cooling system, for example cooler peltier
233 cooling system pump
205 active mixing area
310 UV filter
450 return tube

The invention claimed is:

1. A method for producing a drink in a container from mixing a powder formula with a hot liquid having a first temperature, the method comprising acts of:
storing in a storage reservoir cold liquid having a second temperature which is lower than the first temperature;
receiving by a heater the cold liquid from the storage reservoir and providing the hot liquid from the heater;
providing the cold liquid to the container;
preparing a drink concentrate by mixing an amount of the powder formula necessary for a total amount of drink in a certain amount of the hot liquid; and
providing the drink concentrate to the container including the cold liquid to reach a drinking temperature between the first temperature and the second temperature,
wherein the method further comprises one or more of (a) discharging the hot liquid into a mixing unit that comprises an act of cooling the hot liquid by a cooler to provide a cooled liquid to the mixing unit where the preparing act is performed, and (b) discharging the hot liquid by (i) placing the heater in a first state to discharge the hot liquid into the mixing unit where the preparing act is performed, and (ii) placing the heater in a second state to discharge the hot liquid into a return conduit coupled to the storage reservoir.

2. The method of claim 1, wherein discharging the hot liquid into the mixing unit comprises the act of cooling the hot liquid by the cooler to provide the cooled liquid to the mixing unit where the preparing act is performed, wherein the cooler comprises one of a heat exchanger, a Peltier element, a heat sink, a fan and a zeolite-system.

3. The method of claim 1, wherein discharging the hot liquid comprises the acts of:
placing the heater in the first state to discharge the hot liquid into the mixing unit where the preparing act is performed; and
placing the heater in the second state to discharge the hot liquid into the return conduit, wherein the return conduit is configured to feed the hot liquid back to the storage reservoir.

4. The method of claim 1, further comprising acts of:
irradiating the cold liquid with UV radiation from a UV lamp; and
providing an indication of a UV-dose of the UV radiation from a UV lamp.

5. The method of claim 1, further comprising an act of pumping the cold liquid with a pump.

6. The method of claim 1, further comprising acts of:
filtering the cold liquid with a filter;
measuring a lifetime of the filter; and
generating a signal when the lifetime is reached.

7. The method of claim 1, further comprising acts of:
filtering the cold liquid with a filter; and
providing an indication to change the filter when an automated baby-milk machine that includes the filter has not been used for a certain time.

8. The method of claim 1, wherein the preparing act includes an act of stirring the hot liquid and the powder formula while adding the powder formula to the hot liquid to prepare the drink concentrate.

9. The method of claim 1, wherein the preparing act includes acts of:
stirring the hot liquid in the mixing unit to create a water vortex; and
adding the powder formula to the water vortex to prepare the drink concentrate.

10. A method for producing a drink from mixing powder formula with a liquid, the method comprising acts of:
storing in a liquid reservoir of an automated baby-milk machine a cold liquid at a temperature lower than 60 degrees Celsius;
heating by a heater of the automated baby-milk machine the cold liquid from the liquid reservoir to form a hot liquid;
providing the cold liquid to a container;
preparing a drink concentrate by mixing an amount of the powder formula necessary for an end volume of the drink in an amount of the hot liquid from the heater having a temperature between 60 degrees Celsius and 80 degrees Celsius; and
providing the drink concentrate to the container for mixing with the cold liquid in order to reach the end volume of the drink at a desired drinking temperature,
wherein the method further comprises one or more of (a) discharging the hot liquid into a mixing chamber that comprises an act of cooling the hot liquid by a cooler to provide a cooled liquid to the mixing chamber where the preparing act is performed, and (b) discharging the hot liquid by (i) placing the heater in a first state to discharge the hot liquid into the mixing chamber where the preparing act is performed, and (ii) placing the heater in a second state to discharge the hot liquid into a return conduit coupled to the liquid reservoir.

11. The method of claim 10, wherein discharging the hot liquid comprises the acts of:

placing the heater in the first state to discharge the hot liquid into the mixing chamber; and placing the heater in the second state to discharge the hot liquid into the return conduit, wherein the return conduit is configured to feed the hot liquid back to the liquid reservoir.

12. The method of claim 10, wherein discharging the hot liquid into the mixing chamber comprises the act of cooling the hot liquid by the cooler to provide the cooled liquid, wherein the cooler comprises one of a heat exchanger, a Peltier element, a heat sink, a fan and a zeolite-system.

13. The method of claim 10, further comprising acts of:

irradiating the cold liquid with UV radiation from a UV lamp; and providing an indication of a UV-dose of the UV radiation from a UV lamp.

14. The method of claim 10, further comprising an act of pumping the cold liquid with a pump.

15. The method of claim 10, further comprising acts of:
filtering the cold liquid with a filter;
measuring a lifetime of the filter; and
generating a signal when the lifetime is reached.

16. The method of claim 10, further comprising acts of:
filtering the cold liquid with a filter; and
providing an indication to change the filter when the automated baby-milk machine that includes the filter has not been used for a certain time.

17. The method of claim 10, wherein the preparing act includes an act of stirring the hot liquid and the powder formula while adding the powder formula to the hot liquid to prepare the drink concentrate.

18. The method of claim 10, wherein the preparing act includes acts of:
stirring the hot liquid in the mixing chamber to create a water vortex; and
adding the powder formula to the water vortex to prepare the drink concentrate.

* * * * *